Figure 1:
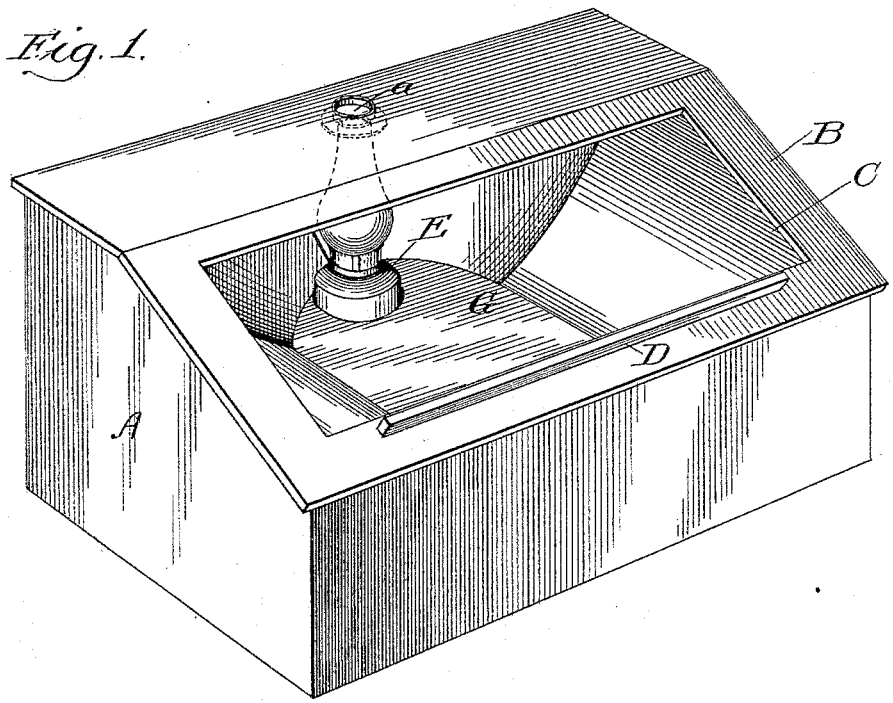

(No Model.)

T. S. FERGUSON.
EGG TESTER.

No. 598,141.

2 Sheets—Sheet 1.

Patented Feb. 1, 1898.

Witnesses
O. F. Dowson
A. E. Thyer

Inventor
Thomas S. Ferguson
by C. W. Lees
Atty.

(No Model.) 2 Sheets—Sheet 2.

T. S. FERGUSON.
EGG TESTER.

No. 598,141. Patented Feb. 1, 1898.

Witnesses
O. F. Douron
R. Elker

Inventor
Thomas S. Ferguson
by ———
Atty.

UNITED STATES PATENT OFFICE.

THOMAS S. FERGUSON, OF OMAHA, NEBRASKA, ASSIGNOR TO THE FERGUSON COMPANY, LIMITED, OF SAME PLACE.

EGG-TESTER.

SPECIFICATION forming part of Letters Patent No. 598,141, dated February 1, 1898.

Application filed April 6, 1896. Serial No. 586,323. (No model.)

*To all whom it may concern:*

Be it known that I, THOMAS S. FERGUSON, a citizen of the United States, residing at Omaha, in the county of Douglas and State of Nebraska, have invented a certain new and useful Apparatus for Candling Eggs, of which the following is a description, reference being had to the accompanying drawings, forming part of this specification.

Candling eggs consists in holding them between the eye and a suitable light—as a candle, gas-jet, or lamp in a comparatively dark place—so that the light will pass through the eggs and enable the person examining them to determine their condition by observing their internal appearance as the light passes through them.

The method of candling now generally employed consists in picking the eggs up in the hand, several at a time, and holding them in the hand between the eyes and the gas-jet or lamp whose rays are to pass through them. In this manner experts in candling can determine at a glance the condition of the eggs; but inasmuch as only a very few eggs can be handled at a time, even if the operator employs both hands at once, and inasmuch as he has to pick the eggs up and then carefully lay them down again each time, it follows that at best it is a comparatively slow and tedious operation where large numbers of eggs are to be examined.

Where large quantities of eggs are handled, they are generally received in what are known as "egg-carriers," consisting of suitable boxes or casings containing divisions and partitions forming a separate cell for each egg to prevent breakage of the eggs by their coming in contact with each other, and each of these egg-carriers, of the size generally employed in commercial use, is adapted to receive and hold thirty dozens of eggs. In candling eggs where they are received in these carriers—as, for instance, where the eggs are to be examined preparatory to placing them in cold-storage warehouses—it is necessary for the person examining the eggs to pick them out of their cells in the carrier, hold them between his eyes and the light to examine them, and to then replace them in cells in another similar carrier or other suitable receptacle, in which they are to be carried to and placed in the cold-storage compartment. These conditions render the candling of eggs even more difficult and slow than if the eggs were supplied to the examiner in loose quantities, as in an ordinary basket, and were to be placed by him after examination in a similar condition in some other receptacle.

My improved apparatus for candling or examining eggs is designed to expedite the operation, so that one person may in the same length of time examine many-fold more eggs than he could possibly do under the old method, and it is intended at the same time to conform to the existing commercial practice in the shipping and handling of eggs which has been mentioned above.

To this end it comprises a suitable candler or candling apparatus by means of which a tray full of eggs, containing in ordinary practice six dozen eggs, may be taken out of the carrier and candled or examined and be replaced in another carrier or suitable receptacle, all in approximately the same length of time which would be required to pick up and examine and replace a half dozen eggs, or at most a dozen, under the old method. Under my new method one person can thus candle from six to twelve times as many eggs in the same length of time as he could do under the old method, and in many large establishments one man may be thus enabled to do the work which has heretofore required the services of six or more. Moreover, inasmuch as in the use of my improved apparatus the eggs do not have to be picked up separately in the hands and are not removed from their trays in the candling operation, (except when spoiled ones are to be replaced with fresh ones,) it follows that there is much less danger of breakage in the candling operation than there was under the old method.

I will now proceed to a more detailed explanation of my improved apparatus by reference to the accompanying drawings, in which—

Figure 2:
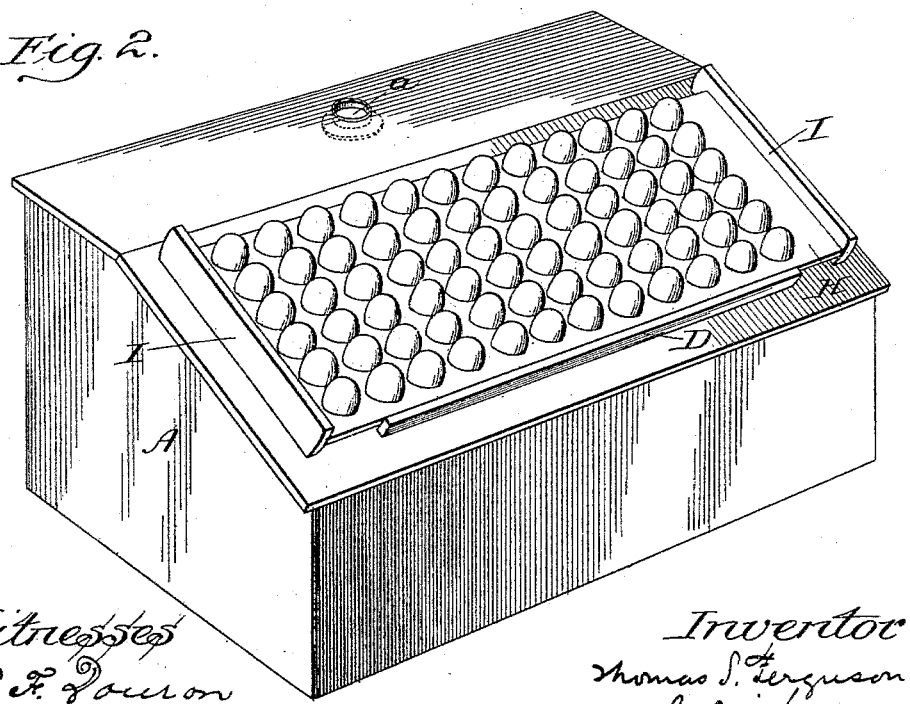
Figure 3:
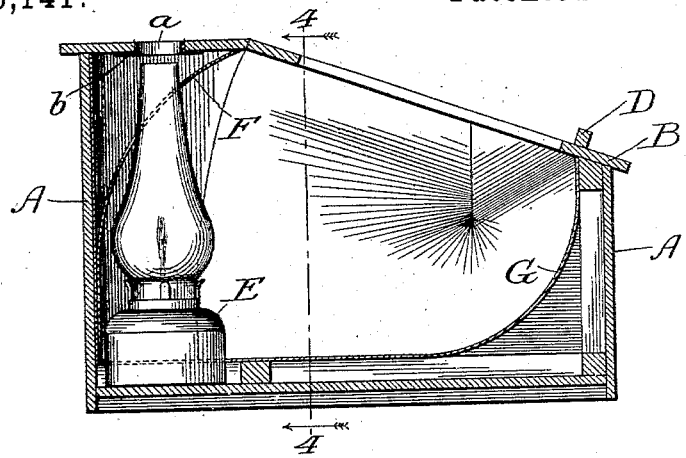
Figure 4:
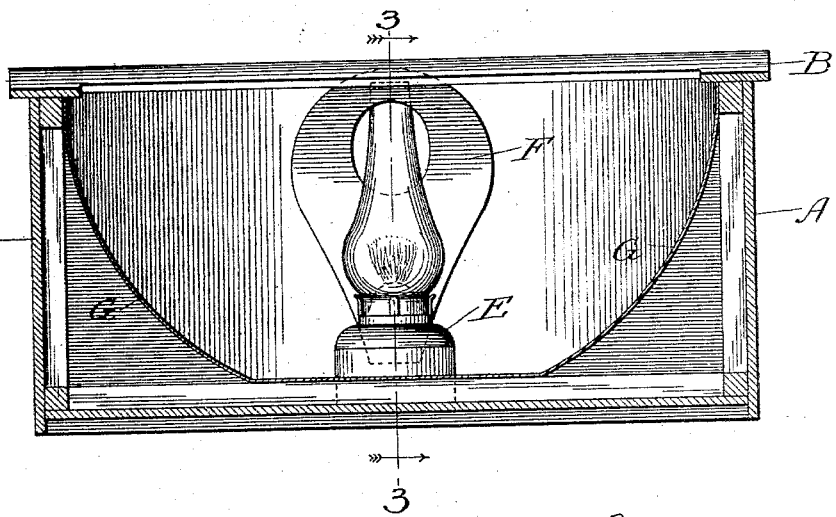
Figure 5:
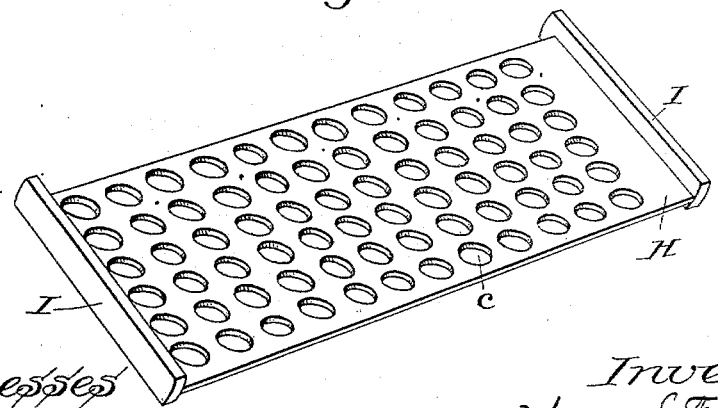

Figure 1 is a perspective view of one suitable form of candler or candling apparatus employed in my new method of candling eggs; Fig. 2, a corresponding view with a tray full of eggs in position upon the candler to be examined; Fig. 3, a middle vertical section of the candler approximately on the line 3 3 of Fig. 4; Fig. 4, a vertical section of the same approximately on the line 4 4 of Fig. 3, and Fig. 5 a perspective view of one of the empty egg-trays employed in connection with the candler.

The same letters of reference are used to indicate indentical parts in all the figures.

The particular form of candler which has been illustrated in the drawings consists of a suitable box A, the forward portion B of whose top is preferably inclined downward and forward, as shown, so as to present an approximately flat surface to the eyes of a person standing in front of the candler and bending over it to examine the eggs in the manner hereinafter described. This inclined top of the box is provided with a large rectangular opening C of approximately the size of the trays which are to be placed over it, as hereinafter described, and secured along the forward edge of this opening is a strip D to hold the trays in position when placed upon the box and prevent them from sliding downward and forward when the operator releases his hold upon them.

Placed in the bottom of the box, near the middle of its rear side, is the illuminating device E, represented in this instance as an ordinary kerosene-lamp, but which may be a gas-jet, an electric lamp, or other suitable device for the purpose.

The chimney of the lamp in the present instance passes through an opening in a curved plate F, of sheet metal, which is secured at its lower end to the rear wall of the box and is curved forward at its upper end and fastened to the top of the box near the rear edge of the inclined portion B thereof. This plate F serves to hold the chimney of the lamp in position and also constitutes part of the internal reflecting-surface of the box, hereinafter described. An opening $a$ is provided in the flat top of the box immediately above the chimney of the lamp to permit the escape of the hot air and products of combustion, and a suitable pipe to carry them away may have its lower end inserted in said opening for that purpose. When the top of the box is made of wood, as in the present instance, any suitable metal protector $b$ may be secured to its under side around the opening $a$ to prevent the hot air from burning the box.

The interior of the box is provided with a lining G, formed of sheet metal, having a bright reflecting-surface, bright tin being used in the present instance, and this lining is so shaped as to concentrate the rays of light upon the opening C in the inclined top of the box, over which opening the trays of eggs are placed to be examined. One of these trays is shown empty in Fig. 5, and one of them filled with eggs is shown in position upon the candler in Fig. 2. The tray consists of a thin board H, provided with suitably-shaped perforations or recesses $c$ for the reception of the eggs (in this instance six dozen in each tray) and having end pieces I I secured to its opposite ends. These end pieces project at one side slightly beyond the edge of the flat body H of the tray and also preferably project both above and below the said flat body H, so that one egg-filled tray may be placed upon another, while the series of openings in the tray approach nearer one end of the tray than the other. Upon placing a series of these trays in reversed position one upon the other it will be seen that the lower and smaller ends of the eggs in any given tray will occupy the spaces between the upper and larger ends of the eggs in the tray immediately below it, and in this manner contact of the eggs in the different trays will be prevented. These trays are used in and form part of the carriers in which the eggs are shipped from place to place and in which they may be stored, if desired, a carrier consisting in commercial use of a rectangular box of suitable length and width for the trays to snugly fit within it and of suitable height or depth to receive five of such trays, said trays being supported one upon the other by their end pieces I I within the box in the reversed order above described. The box of the carrier is usually provided with a suitable lid and a fastening device therefor. The eggs are received in these carriers at the place where they are to be candled or examined, and such candling is done in connection with my new apparatus in the following manner: The person who is to candle or examine the eggs is provided with an extra supply of eggs in a suitable receptacle within his reach from which to obtain fresh eggs to replace any in the trays which the candling operation may show to be spoiled. The carriers filled with eggs are delivered to him at one side of the apparatus and he removes the trays one by one and places them, filled with eggs, over the opening C in the box of the candling apparatus, as shown in Fig. 2. The tray entirely covers said opening, and inasmuch as all the holes in the trays are filled with eggs, which snugly fit them, it follows that the placing of the filled tray over said opening substantially closes the latter against the passage of the rays of light excepting through the eggs themselves. Upon placing a tray full of eggs over the opening, therefore, the light passes through the eggs and the operator is enabled to see at a glance whether all the eggs present the proper appearance to indicate that they are in good condition. If any of them appear defective, he picks them out of the tray and replaces them with good eggs from the supply which he has at hand, as before explained, and then removes the tray and places it in a carrier on the opposite side of the candler for further shipment or storage. Under this method and by this means the examination of six dozen eggs merely requires the handling of a single tray, consisting in lifting it out of one carrier, holding it over the opening in the candling apparatus long enough to observe the appearance of the eggs, (which an expert can do at a glance,) and then placing it in another carrier. It requires but little more time and labor to examine a tray full of eggs in this manner than to examine two handfuls of eggs under the old method, and the eggs do not have to be removed from their seats in the trays and separately handled at all, excepting in the cases of the few found defective, but are simply transferred from one carrier to another and examined while in transit with very little more time and labor than would be required for the mere transfer without any examination of the eggs. The good eggs are thus not disturbed at all and the trays are merely removed from one carrier and placed in similar positions in another carrier, with practically no opportunity for accidental breakage of the eggs, and with a facility and speed many-fold greater than has heretofore been possible.

While it is in fact true, as stated in the foregoing specification, that the method of candling eggs now generally employed in actual practice consists in picking the eggs up in the hand, several at a time, and holding them in the hand between the eyes and a lamp or other illuminating device, I am also aware that it has heretofore been proposed to employ a variety of forms of candling apparatus, some of which have been intended to be used in connection with trays of eggs, whereby a tray full of eggs could be examined at once, as is the case with my apparatus; but in none of the instances with which I am familiar has it been proposed to employ a candling apparatus such as mine in combination with egg-trays similar to mine, and in none of the instances has the proposed construction and mode of operation been such as to permit the trays of eggs to be removed from the shipping cases or carriers and efficiently tested or candled and replaced in the cases or carriers with such ease, safety, and speed as is possible in the use of my candling apparatus and trays.

Having thus fully described my invention, I claim—

1. The herein-described candling apparatus, comprising the box A having the inclined top B provided with the rectangular opening C containing the illuminating device E and reflecting-surfaces for throwing the rays of light through the opening C in its inclined top B, in combination with the egg-holding tray consisting of the thin board H provided with the egg-seatings c for the reception of the eggs and having the opposite end pieces I I projecting vertically from its surface, a series of such trays filled with eggs being adapted to be supported one upon another by means of said end pieces I I in the casing or box of an egg-carrier and adapted to be removed directly from such carrier and successively placed over the opening C in the inclined top B of the box A, to test the eggs, and be then replaced in a carrier without individual handling of the eggs, all substantially in the manner and for the purpose set forth.

2. The herein-described candling apparatus, comprising the box A having the forward portion B of its top inclined downward and forward and provided with the rectangular opening C, and having the portion of its top in rear of the part B approximately horizontal, the strip D along the lower forward edge of the inclined top B, the lamp E located within the box A near its rear wall, and the sheet-metal lining G having a bright reflecting-surface adapted to direct the rays of the lamp through the rectangular opening C in the inclined top of the box A, in combination with the egg-holding tray consisting of the thin board H provided with the egg-seatings c and having at its opposite ends the end pieces I I projecting vertically from its surface, a series of such trays filled with eggs being adapted to be supported one upon another by means of their end pieces I I in the casing or box of an egg-carrier, and being adapted to be removed directly from the carrier and successively placed over the opening C in the inclined top B of a box A and rest against the strip D, to test the eggs, and then replaced in a similar carrier without individual handling of the eggs, all substantially in the manner and for the purpose set forth.

In testimony whereof I affix my signature in presence of two witnesses.

THOMAS S. FERGUSON.

Witnesses:
F. K. DARLING,
S. H. WALKER.